Dec. 4, 1956 J. A. ZERANTE ET AL 2,772,504
FISHING FLOAT
Filed June 23, 1954

James A. Zerante
Norman E. Bergdall
INVENTORS

BY *Clarence A. O'Brien*
*and Harvey B. Jacobson*
Attorneys

United States Patent Office 2,772,504
Patented Dec. 4, 1956

2,772,504

FISHING FLOAT

James A. Zerante and Norman E. Bergdall, Lima, Ohio

Application June 23, 1954, Serial No. 438,690

1 Claim. (Cl. 43—17)

This invention relates to a fishing float and more specifically provides an improved construction in a turnover or inverted type fishing float.

An object of this invention is to provide a fishing float that will be inverted by a tug on the fish hook by a fish wherein the fisherman will be able to readily observe even the slightest tug or pull on the fish hook.

Another object of this invention is to provide a fishing float having a movable weight thereon wherein the position of the float will be inverted from its normal operative position when a fish tugs on the fish hook.

A further object of this invention is to provide a fishing float that may be colored differently on its upper half and lower half wherein a quick glance will indicate whether the fish hook has been pulled by a fish.

Still another important object of this invention is to provide a fishing float having novel attaching means for securing the float adjustably on the fishing line wherein the depth of the hook may be determined and wherein the fishing float will indicate the taking of the bait by a fish.

Further important features of the present invention reside in the simplicity of construction, efficiency in operation, its ready adaptation for its intended purposes and inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
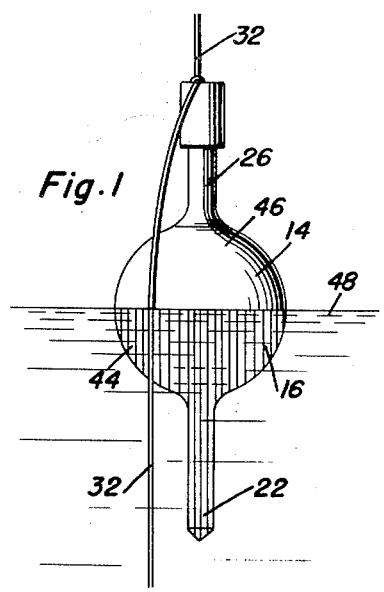
Figure 1 is a side elevational view of the fishing float of the present invention in its normal position wherein the fish hook is baited and ready for a fish to strike the bait.
Figure 3:
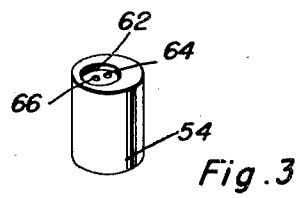
Figure 3 is a detailed perspective view showing the construction of the spring urged cap member for securing the fishing float of Figure 1 to the fishing line.
Figure 2:
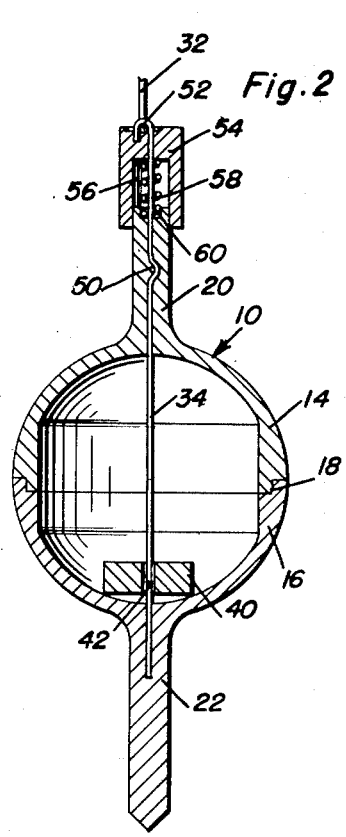
Figure 2 is a longitudinal, vertical sectional view taken substantially along a plane passing through the longitudinal center line of the construction of Figure 1.

Referring now specifically to the drawings, it will be seen that the numeral 10 generally designates the fishing float of the present invention as illustrated in Figures 1–2. The fishing float 10 includes a spherical hollow body as indicated by the numeral 12 having an upper half 14 and a lower half 16 joined together by staggered grooves as indicated by the numeral 18. The upper member 14 and the lower member 16 are provided with projecting studs or end portions 20 and 22 respectively which are diametrically opposed. The upper end of the wire 34 extends completely through end portion 20 and is embedded therein as indicated by the numeral 50. The upper end of the wire 34 projects above the upper end of the upper stud 20 and is reversely bent in a hook-shaped member 52. A cap 54 having a socket 56 therein is slidably positioned on the upper end of the stud or end portion 20 with the stud 20 engaging the socket 56 for sliding telescopic engagement. A coil compression spring 58 is positioned between the upper end of the stud 20 and the inner end of the socket 56 for normally urging the cap 54 outwardly of the stud 20. The spring 58 is seated in a recess 60 and the upper end of the stud 20 for guiding and aligning the spring 58 and the cap 54. The upper end of the cap 54 is provided with a circular recess portion 62 having an aperture 64 therein and an inwardly extending socket 66 of substantially the same size as the aperture 64 wherein the aperture 64 slidably receives the shank portion of the hook end 52 on the wire member 34 and the socket 66 receives the free end of the hook shaped member 52 wherein the fishing line 32 will be engaged by the hook end 52 and retained thereunder. The fishing line 32 is thereby resiliently and detachably secured to the float 10 wherein the position of the float 10 on the fishing line 32 may be adjusted. A wire member 34 is embedded in the lower member 16 and in the upper member 14 and extend diametrically across the body 12. A cylindrical weight 40 having a central aperture 42 is slidable on the cross wire member 34 from a position engaging the inner surface of the lower member 16 to a position against the upper portion of the upper member 14 wherein the upper member 14 is then disposed as the bottom portion of the float 10. The bottom portion 16 of the float is colored one color as indicated by the numeral 44 and the top half 14 of the float 10 is indicated by another color 46 that are easily distinguishable from each other wherein a fisherman may easily tell which end of the float 10 is projecting from the water.

In operation, the float 10 will be disposed in the position as shown in Figure 1 when the fishing line 32 is raised by the fisherman thereby moving the weight 42 to its lower position in engagement with the lower half 16 of the spherical member 12. When a fish engages and pulls the fish hook attached to the free end of the fishing line 32, the upper end along with the cap 54 is pulled downwardly under the water level 48 and the lower member 16 will then be positioned above the water level 48 and the weight 40 will move longitudinally along the wire 34 into engagement with the portion 14 of the spherical member 12 thereby retaining the float 10 in inverted position until such time as the fishing line is again pulled by the fisherman. Due to the distinguishing colors 44 and 46 on the float 10, the fisherman may readily determine if the fish has struck the bait and pulled on the fish hook thereby greatly reducing the eye fatigue normally encountered while fishing in order to determine the position of the float and whether a fish has pulled on the bait and hook.

Figure 4:
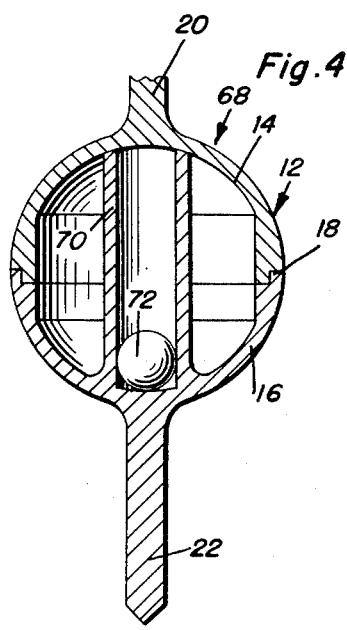
Figure 4 is a detailed, longitudinal, vertical sectional view showing a modified form of fishing float having a spherical shifting weight.

Referring now specifically to the modified form of the fishing float as illustrated in Figure 4 and indicated by the numeral 68. The lower member 16 of the spherical member 12 is provided with a vertically extending tube 70 which is integrally formed with the lower member 16 and engages the inner surface of the upper member 14 and a spherical weight 72 is movably positioned in the tubular member 70 for moving between a position engaging the lower member 16 to a position engaging the upper member 14 when the float 68 is inverted.

Figure 5:
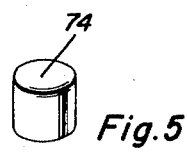
Figure 5 is a detailed perspective view showing a cylindrical weight that may be utilized in the construction of Figure 4.

As shown in Figure 5, a cylindrical weight 74 may be utilized in place of the spherical ball 72 and the tube 70 may be made of polygonal shape suitable for receiving the cylindrical weight 74.

The operation of the device as illustrated in Figures 4 and 5 is the same as the fishing float of the other figure wherein the shifting weight 72 will retain the float 68 in one of two positions wherein a fisherman may readily determine whether a fish hook having bait thereon has been pulled on by a fish.

The fishing float of the present invention may be constructed of any suitable plastic or similar type material which lends itself to ready and distinguishable coloring wherein the device may be manufactured and sold at a reasonable price so that the need of a fisherman for a readily observed indicator for showing whether or not a fish has struck his bait will be fulfilled.

Since numerous modifications and changes will readily occur to those skilled in the art it is not desired to limit the invention to the exact construction shown and described, and accordingly, all suitable modifications and equivalents may be resorted to, falling within the scope of the appended claim.

What is claimed as new is as follows:

A fishing float comprising a hollow spherical body with diametrically opposed projecting end portions, a wire extending diametrically across said hollow body in alignment with the end portions, a weight slidably mounted on said wire, said wire constituting means for releasably retaining a line in attached position to the float, said wire also constituting the guiding means for the weight, said weight being in the form of a disc having a diameter less than one-half the diameter of the interior of the hollow body, said weight having a thickness less than one-half the diameter of the interior of the hollow body thereby permitting the weight to shift from a point completely within one end of the hollow body to a point completely within the other end of the body for stabilizing the hollow body with either end portion thereof disposed upwardly, the outer surface of one end portion and the adjacent one-half of the body being colored one distinguishable color and the other end portion and adjacent one-half of the body being colored a different distinguishable color, said body adapted to float in the water with the end portion having the line attaching means and the adjacent portion of the body being revealed above the water, said body adapted to be inverted by a downward pull on the fishing line extending downwardly into the water thereby causing the weight to slide on the wire guide to a position against the diametrically opposed inner surface of the hollow body thereby retaining the other end portion and the adjacent portion of the body above the water for observation thereof whereby the distinguishable colors will indicate the position of the hollow body.

References Cited in the file of this patent

UNITED STATES PATENTS

| | | |
|---|---|---|
| 514,034 | Redfield | Feb. 6, 1894 |
| 608,063 | Mintzer | July 26, 1899 |
| 1,371,170 | Johnson | Mar. 8, 1921 |
| 1,792,989 | La Gue | Feb. 17, 1931 |
| 1,857,939 | Cameron | May 10, 1932 |
| 2,004,414 | Menefee | June 11, 1935 |
| 2,181,458 | La Gue | Nov. 28, 1939 |
| 2,547,308 | Dean | Apr. 3, 1951 |
| 2,560,129 | Rhotehamel | July 10, 1951 |
| 2,587,311 | Goluick | Feb. 26, 1952 |
| 2,607,153 | Lambach | Aug. 19, 1952 |

FOREIGN PATENTS

| | | |
|---|---|---|
| 23,330 | Great Britain | 1912 |
| 457,034 | Canada | May 31, 1949 |